(12) United States Patent
Maloney et al.

(10) Patent No.: US 12,502,740 B2
(45) Date of Patent: Dec. 23, 2025

(54) FASTENER INSTALLATION TOOL

(71) Applicant: Penn Engineering & Manufacturing Corp., Danboro, PA (US)

(72) Inventors: Michael J Maloney, Doylestown, PA (US); Brian G. Bentrim, Furlong, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 388 days.

(21) Appl. No.: 17/978,337

(22) Filed: Nov. 1, 2022

(65) Prior Publication Data

US 2023/0130776 A1 Apr. 27, 2023

Related U.S. Application Data

(62) Division of application No. 16/307,133, filed as application No. PCT/US2018/031919 on May 9, 2018, now Pat. No. 11,498,166.

(51) Int. Cl.
*B23P 19/06* (2006.01)
*B21D 39/03* (2006.01)
*B21J 15/04* (2006.01)
*F16B 37/06* (2006.01)

(52) U.S. Cl.
CPC .......... *B23P 19/064* (2013.01); *B21D 39/031* (2013.01); *B21J 15/04* (2013.01); *F16B 37/068* (2013.01)

(58) Field of Classification Search
CPC ........................... B21D 39/031; B25B 27/0014
See application file for complete search history.

(56) References Cited

U.S. PATENT DOCUMENTS

| | | | | |
|---|---|---|---|---|
| 4,906,147 A | * | 3/1990 | Friesinger | B23B 31/113 279/97 |
| 5,613,395 A | * | 3/1997 | Zienkiewicz | C21D 7/04 72/391.2 |
| 6,018,978 A | * | 2/2000 | Aniento | B21J 15/048 29/243.526 |

(Continued)

*Primary Examiner* — Sarang Afzali
*Assistant Examiner* — Darrell C Ford
(74) *Attorney, Agent, or Firm* — Gregory J. Gore, Esq.

(57) ABSTRACT

A clinch-in fastener with a cylindrical body having a top, a bottom, sides and an axial internal bore. The fastener has a single shank at the bottom end of the body having a top surface orthogonal to the bore and a chamfer tapering to the bottom of the body. The top surface of the shank is adapted for receiving the cold flow of material surrounding a receiving hole of a workpiece. The shank may have a plurality of notches in its outermost edge that extend through both the top surface of the shank and the chamfer. The bore of the fastener extends completely through the fastener body from top to bottom and may be threaded. A fastener installation system having a tool with means for affixation to a rotary and vertically reciprocal element of an industrial machine. The tip of the tool has a distal end face with at least one arcuate displacer adapted for deforming a workpiece as the tool rotates and is pressed against the workpiece. A bore within the tip holds a fastener installed by the tool. The displacer is vertically and radially tapered along an arcuate ridge centered about the axial bore. The width of the displacer is also tapered to a point.

17 Claims, 7 Drawing Sheets

(56) References Cited

U.S. PATENT DOCUMENTS

| | | | | |
|---|---|---|---|---|
| 2005/0111911 A1* | 5/2005 | Zdravkovic | ........... | B23P 19/062 |
| | | | | 403/283 |
| 2009/0139375 A1* | 6/2009 | Hathaway | ............ | B25J 15/0416 |
| | | | | 700/275 |
| 2016/0263641 A1* | 9/2016 | Savoy | .................... | B21J 15/025 |
| 2016/0332215 A1* | 11/2016 | Blacket | .................. | B23K 20/24 |
| 2017/0320127 A1* | 11/2017 | Tripp | .................... | B23B 31/113 |

* cited by examiner

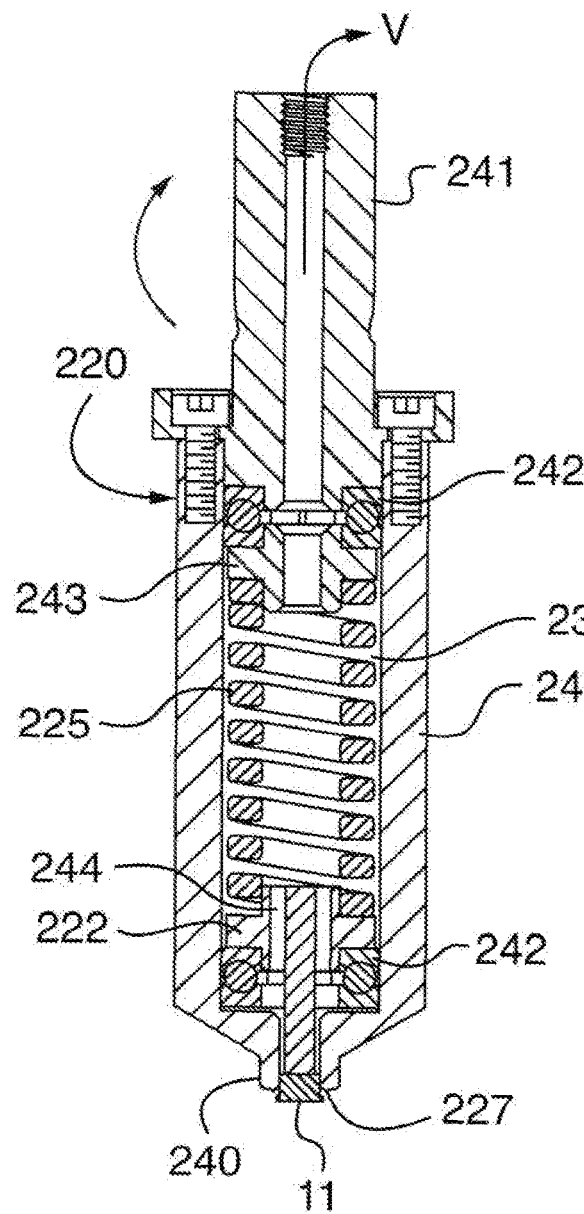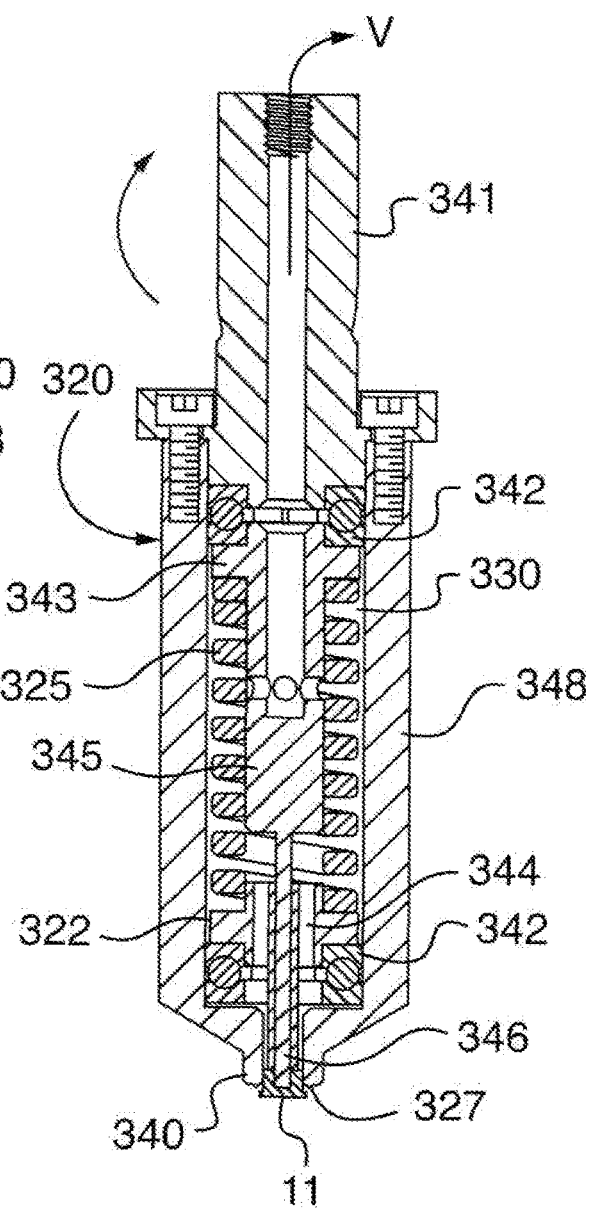

FASTENER INSTALLATION TOOL

CROSS-REFERENCE TO RELATED APPLICATIONS

This application is a divisional of non-provisional patent application Ser. No. 16/307,133 entitled "Fastener and Installation Method for Very Thin Sheets" filed Dec. 4, 2018, which is incorporated herein by reference and priority from which is hereby claimed.

FIELD OF THE INVENTION

The present invention relates to fasteners, and methods of installing, that can be fastened to very thin sheet material. In one preferred embodiment, the fastener is a concealed head standoff fastener that is installed with a rotary punch.

BACKGROUND OF THE INVENTION

There are many fastening applications that require installation of a threaded fastener in a blind hole. For example, this installation method is often used for assembling components of a waterproof apparatus. However, more often than not, this installation method is used when the cosmetic appearance of the apparatus is important and no blemish can be visible on the surface after assembly.

Known self-clinching fasteners have a displacer and an undercut at the bottom of the fastener. The depth of the blind hole, and thus the material thickness of the sheet or component, must be large enough to accept the full height of the displacer, undercut and shank. Furthermore, there must be additional material thickness below the hole to disperse installation stresses, and to eliminate or reduce marking during installation to a point where any blemish can be removed in a secondary finishing operation. Therefore, many known self-clinching fasteners can only be installed in relatively thick sheets or components.

On the other hand, many applications, such as consumer electronics, require the assembly of relatively thin sheets or components. In one known assembly method, consumer electronic components are initially formed from a thick material. Then, to reduce the component's overall weight and stature, material is machined away everywhere except the fastening locations on the component, which retain the original (greater) thickness of the component. This process is costly and wasteful. Other methods of assembling thin sheets or components, such as laser welding or adhesives, are impractical or not feasible in production due to material burn through or long cure times. Therefore, it would be desirable to provide a more efficient method of assembling thin sheets or components. Since self-clinching fasteners are a preferred fastener type, it would be desirable to provide an improved fastener and installation method having the advantages of self-clinching fasteners but can be fastened in very thin sheets.

SUMMARY OF THE INVENTION

In one preferred embodiment, the present invention provides clinch-in fasteners that can be installed by clinch-in fastening in holes of very thin workpieces, such as metal sheets, using novel tooling and installation methods. For example, the fasteners can be clinched in a blind hole as shallow as 0.014 inches deep. The clinch-in fastener is preferably used with an installation tool that displaces sheet material against and over structural features of the fastener that resist axial pull-out and torque. Moreover, the inventive fastener and installation minimize and/or eliminate marking or blemishes on the opposite side of the panel during installation.

Usually, self-clinching fasteners for thin panels require very tight tolerances. To ease this requirement, preferred embodiments of the fastener have a lead installation shank that has a chamfered lead surface and an outer diameter that interferes slightly with the side of the hole.

In preferred embodiments, the shank is not actively pressed on by the tool during installation. Instead, a force is initially applied to the top of the fastener to insert the fastener in the hole by overcoming the shank/hole interference. The force also holds the fastener in the hole during clinching. In one preferred embodiment, the force is applied by a spring-loaded plate within an installation tool. Then, the installation tool rotationally presses material surrounding the hole and deforms it onto a top surface of the shank to clinch the fastener to the workpiece.

In one preferred embodiment of the invention, the fastener has a cylindrical body with a top, a bottom, side walls, and an internal axial bore. The bore may extend entirely through the body. A single shank is fixed to and extends radially from the side walls near the bottom of the body. The shank has a top surface, side surface and chamfer. The top surface preferably lies in a plane that is orthogonal to the central axis of the body. The side surface is preferably co-axial with the central axis. The chamfer extends from the side surface at an angle that is skew to the central axis. The chamfer tapers downwardly-inwardly from the side surface towards the bottom of the body. The top surface of the shank is constructed and arranged to receive the cold flow of workpiece material surrounding a hole in a workpiece.

In another preferred embodiment, the shank includes a plurality of peripheral notches. At least one of the notches is preferably formed in an outermost edge of said shank. At least one notch may extend through the top surface of the shank, the side surface, the chamfer, or a combination of those surfaces.

Another preferred embodiment of the invention comprises an assembly of the clinch fastener described above affixed in a blind hole of a workpiece. The workpiece may preferably be a planar sheet of aluminum. The fastener is affixed to the workpiece by displacing material surrounding the hole onto at least the top surface of the shank. The displaced material may also fill one or more of the notches in the fastener shank. In one embodiment, at least one of the internal threads of the fastener is covered with material displaced from a central raised area of workpiece material in the receiving hole.

The fastener may have a variety of shapes and functionality. For example, in one embodiment, the fastener may be a concealed head standoff. In another preferred embodiment, the fastener may comprise a two-part fastener arrangement for connecting cooperating panels. In this embodiment, for example, one fastener may be a floating-pin retainer while the other may be a magnetic release gripper. In this latter embodiment, the fasteners interconnect to join the cooperating panels together such as the casing of a laptop computer.

In another preferred embodiment, the invention comprises a fastener installation system having an installation tool adapted for affixation to an element of an industrial machine that rotates and translates. Preferably, the industrial machine is CNC milling machine, which applies simultaneous rotational and translational motion, especially vertically-downward motion, to the tool as the fastener is installed into the workpiece.

The tool has a spindle at its top end, which can be removably affixed to the industrial machine. At its bottom end, the tool has a tip with a distal end face (relative to the spin. At least one displacer is fixed to the distal end face, which is constructed and arranged to deform the workpiece as the tip rotates and is pressed against the workpiece. An axial bore in the tip holds the fastener to be installed by the tool. Preferably, the distal end face is orthogonal to the axial bore.

In preferred embodiments, the displacer is vertically and radially tapered along an arcuate ridge centered around the axial bore in the tip. An inside edge of the displacer is chamfered from the ridge to the axial bore and chamfered from the displacer ridge to an outer edge of the displacer. The displacer is preferably vertically tapered along the arcuate ridge. The taper extends from a first end of greatest height down to a second end of zero height. The displacer blends into the end face of the tool at the second end. The width of the displacer is also tapered such that one end of the displacer(s) intersects the end face at a point.

In one embodiment, the tool has two identical displacers located 180 degrees apart. In one preferred embodiment, the length of each displacer is defined by approximately 90 radial degrees of extension from the first end to the second end.

The tool may have fluid communication means extending from the spindle to the tip. The fluid communication means preferably comprises fluid flow channels that connect a vacuum source to the tip. The vacuum created at the tip holds the fastener within the tip bore while the tool rotates.

In another embodiment, the invention provides a method of rigidly affixing a fastener, such as described above, to the workpiece by displacing workpiece material against the fastener. After the fastener is pressed into the blind receiving hole, material surrounding or proximate the hole is displaced against the fastener by simultaneously pressing the tool against the workpiece and rotating the tool. Preferably, the material is displaced onto the top surface of the fastener shank. The fastener and workpiece should be supported by a hard surface such as an anvil. In another embodiment, the material is displaced into at least some of the threads of the internal bore of the fastener.

In a further preferred embodiment, the invention provides method of clinch-in fastening a fastener in a blind hole of workpiece. The method includes the initial steps of providing a fastener and inserting the fastener in the blind hole. Then, workpiece material surrounding the blind hole is displaced against the fastener by: (a) applying a localized force to a segment of the workpiece material proximate the perimeter of the hole. The localized force has force components in both the parallel and perpendicular direction relative to the plane of the workpiece; (b) increasing the localized force until it induces the yield stress in the workpiece and workpiece material deforms radially toward the fastener; (c) radially advancing the localized force around the hole perimeter to a new segment; and, (d) repeating steps (a)-(c) until the localized force has been applied to the entire perimeter of the hole. Preferably steps (a)-(d) are repeated until a sufficient amount of workpiece material has been deformed into contact with the fastener to clinch the fastener in the hole.

In a preferred embodiment, the localized force is applied to the workpiece with a rotatable tool having displacer adapted for deforming the workpiece. Due to its shape, the displacer applies both components (perpendicular and parallel to the plane of the workpiece) of the localized force when the displacer is driven normally into the surface of the workpiece. In another preferred embodiment, the displacer applies both components of the localized force when the displacer is driven normally into the surface of the workpiece and is simultaneously rotated around the perimeter of the hole.

These methods are preferably used with the clinch-in fasteners described above. Workpiece material is deformed onto the top surface of the shank, and optionally into at least one of the threads of the internal bore. The fastener is initially pressed into the blind hole by the spring-biased pusher of the above-described tool.

The inventive fastener, tooling and installation methods provide many advantages over the prior art. For example, embodiments of the invention provide one or more of the following features and advantages.

The displacer is eliminated from the fastener. Instead, it is incorporated into the installation tool. As a result, the minimum hole depth in the workpiece is reduced. This construction also effectively eliminates the undercut in prior art self-clinching fasteners.

Prior art self-clinching fasteners usually include a feature on the displacer that prevents rotation. In embodiments of the present invention, the anti-rotation feature is incorporated into the fastener shank.

The very thin panels of consumer electronic products, and the very small fasteners used to assemble panels, require a very tight tolerance. To account for this small tolerance, the inventive fastener has a chamfered lead installation edge on a shank that will interfere slightly with the diameter of the hole.

The fastener is not actively pressed on during installation. Instead, only a small force is initially needed to press the fastener through the interference between the shank and the hole, and then stabilize the fastener in the hole. The tool includes a spring loaded punch, which is capable of exerting this small initial force. The tool can also exert a much larger force directly on the workpiece to cold deform the workpiece onto the fastener.

The cross section of the displacer is wedge shaped to deform (plows) metal inwardly and onto the top of the fastener shank. Unlike on the fastener, this geometry may be readily formed on the installation tool.

The axial component of the high installation force on prior art self-clinching fasteners can cause excess stress and be carried through to the cosmetic face. In preferred embodiments of the invention, the amount of axial force needed to cold deform the workpiece is reduced by using a rotating wedge. Torque is employed to plow metal over the fastener shank. The amount of axial force is reduced by reducing the cross-sectional area of material being pressed into the panel, by redirecting the axial force into the horizontal orientation with the displacers, and deforming material radially toward the fastener.

Because the installation will require both torque and axial force for installation, equipment must be employed that has this capability. CNC milling machines are used to cut the shallow, flat bottomed installation holes. According to the invention, the same machine, in the same operation, then changes tools automatically and installs a fastener into the hole that was just created. This method eliminates the need for separate installation equipment and the need to handle parts through two operations. This method creates a great economic benefit for the assembly of small consumer electronics.

BRIEF DESCRIPTION OF THE DRAWINGS

FIG. 9 is a cross-section of an installation tool in accordance with another preferred embodiment of the invention;

FIG. 10 is a cross-section of an installation tool in accordance with a further preferred embodiment of the invention;

DETAILED DESCRIPTION OF THE PREFERRED EMBODIMENTS

"Self-clinching fastener" means any device, usually threaded, that, when pressed into ductile metal, displaces the host material around the mounting hole, causing it to cold flow into a specially designed annular recess in the shank or pilot of the fastener." "Clinch-in" fastener means any device, usually threaded, that, can be mechanically fastened in a blind receiving hole of a metal workpiece by cold deforming the metal surrounding the hole into contact with the device. "Clinch-in fastening" as used with reference to a fastener and metal workpiece is used in its broadest send to mean the process of joining the fastener to the workpiece (without additional components) using a tool to plastically deform the workpiece into contact with the fastener to form a mechanical interlock between the fastener and the workpiece.

Figure 1:
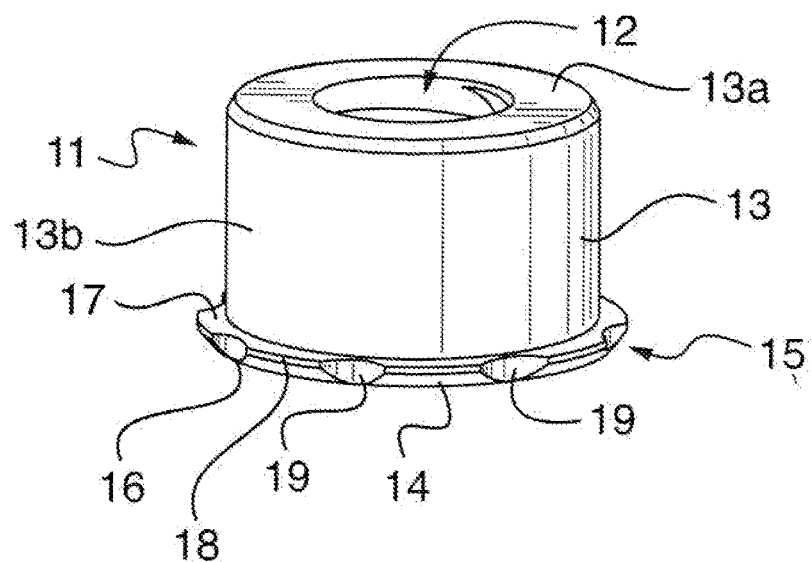
FIG. 1 is a perspective view of a fastener in accordance with a preferred embodiment of the invention.

A fastener in accordance with a preferred embodiment of the invention is shown in FIGS. 1-3 and 6, and is designated generally by reference numeral 11. Referring to FIG. 1, the fastener generally comprises a cylindrical body 13 having an axial, threaded bore 12 that extends completely through the body 13 from the top 13a to the bottom 13c of the body 13. In one preferred embodiment, the top and bottom of the body are flat and the side walls are cylindrical. However, one or more of those surfaces may be curved, tapered, or have a different regular or irregular geometry in other preferred embodiments.

At the bottom 13c of the body 13, a shank 15 protrudes radially from the side walls 13b. The shank has a top surface 17, a side surface 18, a chamfer 14, and a bottom surface 16. In a preferred embodiment, the top surface 17 of the shank 15 is flat, annular and lies in a plane that is orthogonal to the central axis of the body, and parallel to the top 13a and bottom 13c of the fastener body 13. Preferably, the side surface 18 is cylindrical, and co-axial with and parallel to the side walls 13b of the body 13. Preferably the chamfer surface 14 extends at an angle that is skew to the central axis of the body, and tapers downwardly-inwardly from the side surface 18 towards the bottom 13c of the body 13.

In one preferred embodiment, the bottom surface 16 of the shank 15 is flat, annular and lies in a plane that is orthogonal to the central axis of the body 13, and parallel to the top 13a and bottom 13c of the body 13. In a preferred embodiment, the bottom surface 16 is continuous and co-planar with the bottom 13c of the body 13. By locating the shank at the very bottom of the body, the minimum thickness of the workpiece can be minimized. In other embodiments, the chamfer may blend directly into the bottom of the body, thereby eliminating the bottom surface of the shank.

Figure 2:
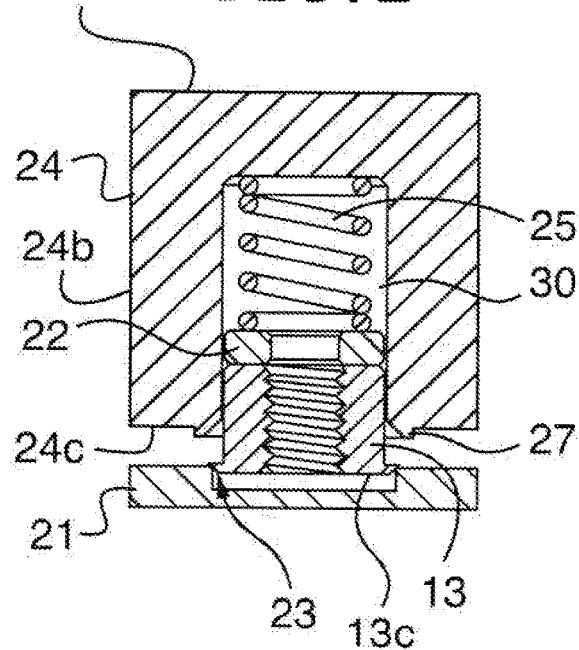
FIGS. 2 and 3 are cross-sections showing the fastener of FIG. 1 and an installation tool at sequential steps as the fastener is installed in a workpiece in accordance with a preferred embodiment of the invention.
Figure 3:
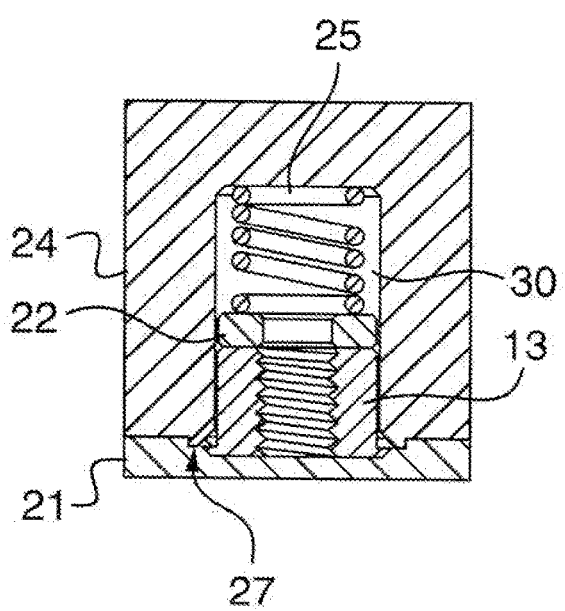

In the embodiment shown in FIGS. 1-3, the shank 15 includes a short side surface 18, which functions to control the diameter of the shank during manufacturing. It is theoretically possible to eliminate the side surface. However, if the flat top surface 17 and chamfer 14 were contiguous, they would likely form a metal burr on a sharp edge during manufacturing. For practical handling, the burr would need to be trimmed off, thereby leaving a straight side surface. Therefore, the side surface is preferable to control the quality and dimensions of the shank diameter.

In one preferred embodiment, the top 17 surface, side surface 18, chamfer 14 and bottom surface 16 are illustrated and described as planar. However, one or more of those surfaces may be curved, tapered, or have an irregular shape in other preferred embodiments.

The top surface 17 of the shank 15 is adapted to receive the cold flow of material surrounding a blind hole in a workpiece 21 such as seen in FIGS. 2 and 3. The shank 15 includes a plurality of notches 19, which also receive displaced material to provide torque resistance once the fastener 11 is installed in the workpiece 21. In a preferred embodiment, the notches 19 are equally spaced around the perimeter of the shank. Preferably, the notches 19 extend through a portion of both the top surface 17 of the shank 15 and the chamfer 14.

FIGS. 2 and 3 illustrate a method of installing the fastener 13 in a blind hole of a workpiece 21 in accordance with a preferred embodiment of the invention. Preferably, the fastener 13 is installed in two steps using a novel installation tool 20, which pushes the fastener 13 into the blind hole and displaces (cold deforms) the material around the perimeter of the hole onto the top surface 17 of the shank 15. The workpiece 21, is made from a material that allows the cold flow of material when compressed.

In the embodiment shown in FIGS. 2 and 3, the tool 20 generally comprises a cylindrical tool body 24 having an axial, proximal end 24a, cylindrical side walls 24b, and an axial, distal end 24c having a central, axially-extending blind bore 30. Wedge-shaped displacers 27 extend axially from the distal end 24c of the tool body 24 and preferably surround the opening of the bore 30. The tool 20 has a compression spring 25 seated at one end in the bottom of the bore 30, and connected at the other end to a push plunger or "pusher" 22. The pusher 22 is constructed and arranged to exert an axial displacement force on the top surface 13a of the fastener 13 when the fastener is partially inserted in the bore 12. The pusher 22 preferably has a shape and size that compliments the shape and size of the central bore 30 and permits the pusher 22 to freely reciprocate within the bore 30 without binding. The compression spring 25 controls the magnitude of the installation force of the pusher 22 on the fastener, thereby reducing the possibility of pressure marking on the back side of the panel. The spring 25 also isolates the high installation force of the displacer (described below) from pressing on the fastener as well, reducing the possibility of pressure marking by reducing the area in high compression.

Figure 4:
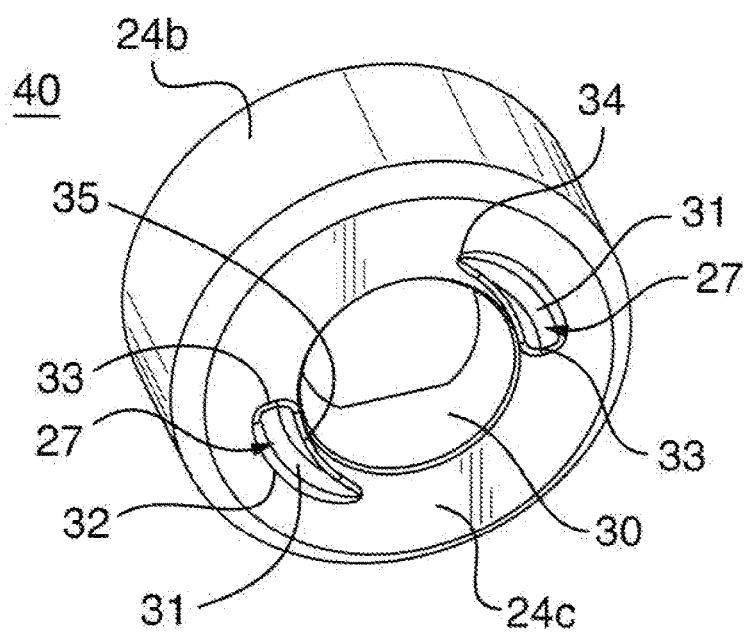
FIG. 4 is a perspective view of the bottom, distal surface of the tool shown in FIGS. 2 and 3.

The working end or tip 40 of the installation tool 20 of FIGS. 2 and 3 is shown in greater detail in FIG. 4. The distal end surface 24c of the tip 40 is orthogonal to the axial bore 30 for engaging the workpiece. The tool 20 has at least one displacer 27 on the tip 40. In the embodiment shown in FIG. 4, the tool 20 has two, identical, diametrically-opposed displacers 27. The displacers 27 are both vertically and radially tapered along an arcuate ridge 31 that is centered about the axial bore 30. Each displacer 27 is chamfered from the arcuate ridge 31 inwardly to the axial bore 30 and is also chamfered from the arcuate ridge 31 to an outer edge 32. Each displacer 27 is vertically tapered along the arcuate ridge 31 from one end of greatest height (the "back end 33" based on the intended direction of rotation) down to an opposite end (the "front end 34" based on the intended direction of rotation) of zero height where the ridge 31 meets the end face 24c. Furthermore, the width of the displacers 27 is tapered from its maximum width at the back end 33 to its minimum width at the front end 34. At the front end 34, the width of the displacers 27 intersects the working surface 24c at a point.

In this embodiment, the two displacers 27 are located approximately 180 degrees apart. The displacers 27 are identical and the length of each displacer 27 measures approximately 90 radial degrees about the tool central axis from the one end 33 to the other end 34. Compared to prior art flat-faced displacers having a rectangular cross-section, the wedge displacers 27 of the invention push some metal radially inward as they move downwardly into the workpiece.

Referring to FIG. 2, a fastener 13 is initially inserted into the central bore 30 of the tool 20 until the top surface 13a abuts the pusher 22. In this position, the fastener 11 is held within the tool 20 with a portion of the fastener, including the shank 15, protruding from the bore opening. The bottom 13c and shank 15 of the fastener 11 is then pressed against the perimeter of receiving hole 23 in the workpiece 21 by the pusher 22 as shown in FIG. 2. The chamfer 14 on the shank 15 helps center the fastener 11 in the hole 23.

Referring to FIG. 3, the tool 20 next moves downwardly to insert the fastener 11 in the hole 23. In preferred embodiments, the diameter of the shank 15 is nearly exact or slightly larger than the diameter of the blind hole 23 to account for very tight tolerances of very small fasteners and very thin sheets. The stiffness of the spring 25 creates enough force on the top surface 13a of the fastener 11 to overcome this "interference zone" and press the fastener 11 into the hole 23. As the fastener 11 moves downwardly, the shank cold deforms some material surrounding the hole 23 into abutting interface with the chamfer 14.

Once inserted in the hole, the pusher 22 continues to steady and support the fastener in its upright position. Next, the tool translates further downwardly until the displacers 27 contact the workpiece. When the force of the displacer on the workpiece induces the yield stress into the workpiece material, rotation of the tool is preferably initiated. As the tool rotates, the displacers 27 cold deform inwardly the material surrounding the blind hole 23 onto the top surface 17 of the shank 13 and preferably into one or more of the notches 19. As deformation occurs and material is pushed radially, the yield stress on the workpiece gradually reduces if the displacers are not pressed further into the workpiece. Therefore, as rotation and radial deformation occurs, the tool translates continuously downward to maintain a steady force in the workpiece in excess of the yield stress. This process continues until a sufficient amount of material has been displaced onto the top of the fastener flange 15 to lock the fastener 11 in the workpiece 21.

The amount of force on the fastener and workpiece, and the amount of work, required to install a fastener 11 in accordance with preferred embodiments of this invention is less than the prior art methods using a displacer with a flat face. In prior art self-clinching fasteners, the displacer has a rectangular cross section, which deforms (pushes) all material in a downward direction and causes material to bulge into an undercut. In contrast, the wedge-shaped displacers 27 deform (push) some metal material radially inwardly as they move downwardly. Since the narrow apex or arcuate ridge 31 of the displacer 27 first contacts the workpiece, the force on the workpiece at the beginning of the displacement is very low. Then, for every increment of downward vertical displacement, the force on the workpiece increases until the displacer 27 is fully embedded. While this force gradually increases, this force is always lower than force exerted by a comparable, prior art, flat-faced displacer having a base and height equal to the base and height of the tapered displacer 27. Once the tapered displacer 27 is fully-embedded, the respective forces are nearly equal. This comparison of forces is graphically illustrated in FIG. 6.

Figure 6:
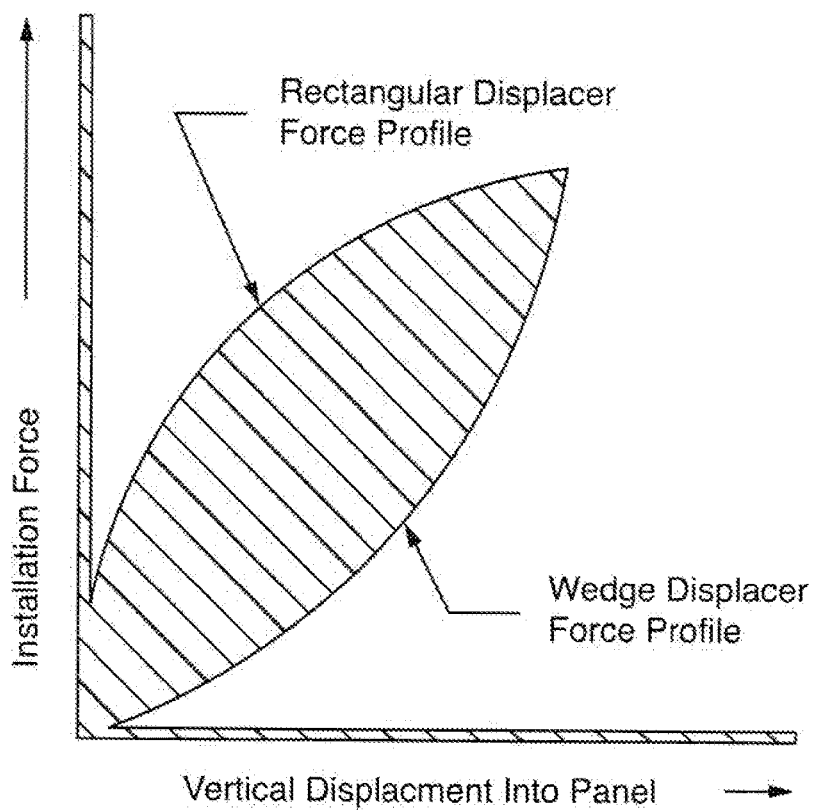
FIG. 6 is a graph that illustrates the beneficial force profile of the invention.

Furthermore, since the amount of work is the product of force and distance, the amount of work exerted by the tapered displacer is much lower than its prior art counterpart. The reduction in work to deform an equal amount of material compared to the prior art is also illustrated in the graph of FIG. 6. The area shown in the hatched portion of the diagram represents the amount of work that is saved using a wedge displacer 27.

Figure 5A:
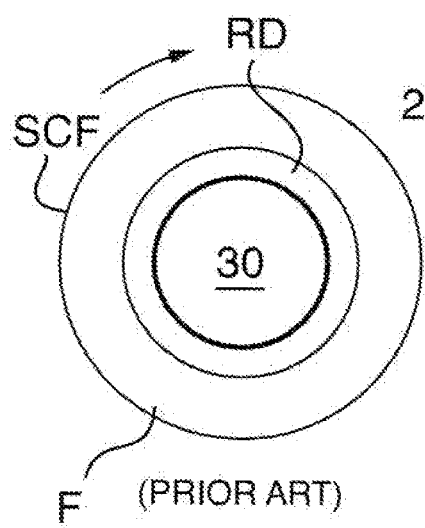
FIGS. 5a, 5b and 5c schematic illustrations of distal end surfaces of various tools.
Figure 5B:
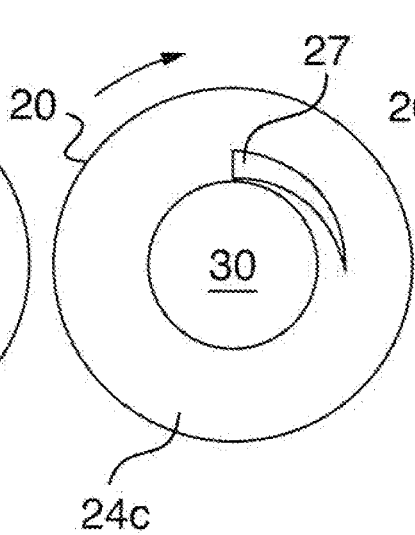
Figure 5C:
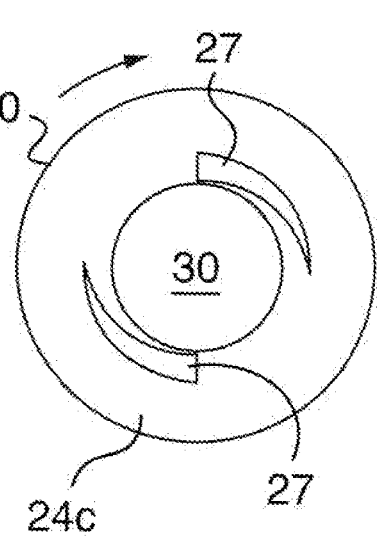

In preferred embodiments, the tool is rotated counterclockwise with respect to the embodiment shown in FIG. 4 and clockwise in the direction shown in FIGS. 5a-c, wherein the narrow, pointed end of the displacer 27 leads.

The aforementioned force reduction permits clinch-in attachment of the fastener 11 into a very thin workpiece 21 such as an electronics panel. Even when applied into a blind hole as shown in FIGS. 2 and 3, no distortion can be seen on the opposite side of the workpiece 21, which is very important to the aesthetic appearance of consumer products.

The above-described force reduction also is achieved in part because the displacers 27 are located on the installation tool 20 and not on the fastener 11, and because the displacers 27 are wedge shaped and not rectangular with a flat bottom working surface. This tool construction can therefore be used with a fastener having a very shallow shank. As a result, the fastener and workpiece have a strong attachment but have minimal displacement of the workpiece material.

FIGS. 5a-c schematically illustrate the tips of three installation tools. The shaded areas represent the cross section of the base of the displacer on each tool. The fastener is staged in the center hollow area of each tool.

The tool shown in FIG. 5a represents a simple ring displacer "RD" on the face "F" of a prior art, self-clinching fasteners "SCF", which is pressed axially only onto the workpiece. The tools shown in FIGS. 5b and 5c represent tools in accordance with preferred embodiments of the invention having a single (FIG. 5b) and a pair (FIG. 5c) of displacers 27. The force necessary to clinch workpiece material using either of these tools is $F=P/A$, where P is the pressure that is equal to the yield stress of the workpiece and A is the cross-sectional area of the ring displacer (represented by the shaded area). The tools shown in FIGS. 5b and 5c are rotated in the direction shown by the rotation arrows. When rotated, both tools in FIGS. 5b and 5c will displace the same amount of material as the tool shown in FIG. 1 when rotated through at least 360 and 180 degrees, respectively. If both tools of FIGS. 5b-c are pressed into the workpiece and rotated 360 and 180 degrees, respectively, the displacement effect is the same as when the prior art tool of FIG. 5a is axially pressed into the same workpiece. By comparison to the prior art, much of the installation work is expended as torque with the rotational tapered displacers compared to axial displacement with the prior art.

The cross sectional area of the displacer of FIGS. 5b and 5c is one-sixth (⅙) and one-third (⅓), respectively, of the displacer shown in FIG. 5a. Therefore, the resulting axial force necessary to press these two displacers into the workpiece is also one-sixth (⅙) and one-third (⅓), respectively, of the displacer shown in FIG. 5a.

Of the two preferred embodiments shown in FIGS. 5b and 5c, the dual-displacer embodiment shown in FIG. 5c is preferred. With only a single displacer 27, the flange may be loaded unevenly during deformation, which can dislodge the fastener before installation is complete.

Figure 7:
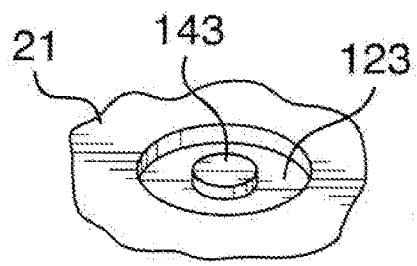
FIG. 7 is a perspective view of a receiving hole in a workpiece in accordance with another preferred embodiment of the invention.
Figure 8:
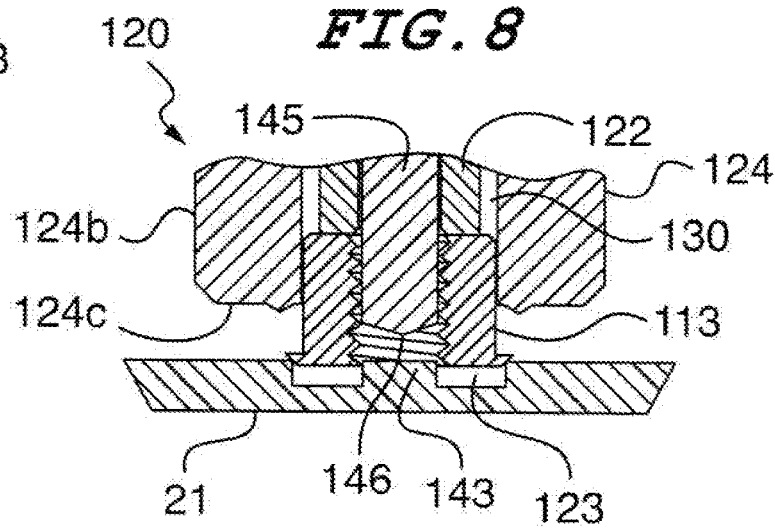
FIG. 8 is a cross-section showing the fastener of FIG. 1 and installation tool as the fastener is installed in the receiving hole shown in FIG. 7 in accordance with a further preferred embodiment of the invention.

A tool 120 and method of installing a clinch fastener in a thin workpiece in accordance with another preferred embodiment is illustrated in FIGS. 7 and 8. In this embodiment, the receiving hole 123 of the workpiece 21 is donut shaped and has a central raised area of material forming a central knob 143. The knob 143 can be formed by known methods such as removing the material around the knob 143 when the hole 123 is formed.

The tool 120 has a construction similar to the tool 20 described with reference to FIGS. 2 and 3. The tool 120 generally comprises a cylindrical tool body 124 having an axial, proximal end (not shown), cylindrical side walls 124b, and an axial distal open end 124c having a central, axially-extending blind bore 130. Wedge-shaped displacers 127 extend axially from the distal end 124c of the tool body 124 and preferably surround the opening of the bore 130. However, in this embodiment, the tool includes a central, center punch 145 extending axially from the bottom of the bore 130. The punch 145 has a pointed distal tip 146. Similar to the tool 20 of FIGS. 2 and 3, the tool 120 has a spring-biased pusher 147; however, in this embodiment, the pusher 147 has a central aperture through which the punch 145 extends.

The tool 120 is used to install a fastener 11 in the same manner, and using the same steps, as described with respect to the first tool 20. The fastener 11 is held in position against the panel 21 by the pusher 122. The spring-biased pusher 122 supports the fastener in the blind hole 123 as the displacer 127 cold deforms material surrounding the outer perimeter of the hole 123 onto the top 17 of fastener shank 15. However, in addition, as the tool 120 moves downwardly, the center punch 145 cold deforms the knob 143 outwardly and into at least one of the threads of the fastener 11 at the same time that the displacers 127 cold deform material around the perimeter of the hole 123 inwardly and onto the top surface 17 of the shank 15. The cold deformation of the knob 43 preferably occurs at the same time as deformation at the outer perimeter of the hole 123. This construction creates a more secure connection between the fastener 11 and the workpiece 21.

An installation tool in accordance with an additional embodiment of the invention is shown in FIG. 9 and is designated generally by reference numeral 220. The tool 220 has an elongate, generally-cylindrical casing 248, which has a tip 240 at the bottom with a structure and characteristics that are similar to the tool shown in FIGS. 2-4. A spindle 241 is fixed to and extends from the upper end of the casing 248. The spindle 241 is constructed and arranged to attach to an industrial machine such as a CNC milling machine (not shown), which can rotate and translate the tool downwardly with force against the workpiece. The spindle 241 can be tailored to match a particular machine's collet or chuck.

Within the bore 230 of the casing 248, the tool 220 has a compression spring 225 seated between two thrust bearings 242. At the upper end, the spring 225 is connected to the thrust bearing by a coupler 243. At the lower end, the spring 225 is seated against one side of the pusher 222. The other side of the pusher 222 is seated in another thrust bearing 242. The pusher 222 preferably has a shape and size that compliments the shape and size of the central bore 230 and permits the pusher 222 to freely reciprocate within the bore 230. The compression spring 225 controls the magnitude of the installation force of the pusher 222 on the fastener 11, thereby reducing the possibility of inadvertently making pressure marks on the back side of the panel. The force of the spring 225 should preferably be great enough to push the shank 15 of the fastener 11 through the interference zone of the hole 23. In a preferred embodiment, the compression spring 225 comprises a die spring.

Once the fastener 11 bottoms out in the receiving hole 23, the tool 220 is further advanced downwardly and simultaneously rotated to enable the displacer(s) 227 to deform and push metal radially-inwardly over the top surface 17 of the fastener flange 15, which attaches the fastener 11 to the workpiece as seen in FIG. 3.

In a preferred embodiment, the pusher 222 has axial bores 244 that extend from one end of the pusher 222 to the other. The bores 244 create a fluid communication channel extending from the distal tip 240 of the tool 220, through the casing 248, through the spindle 241, and to a vacuum source "V". The vacuum source "V" creates suction at the tip 240 of the tool to pick up and/or secure the fastener in the bore during crimping.

Because CNC control allows for variable speed and downward feed, discreet installation values for various workpiece materials can be developed. The tool can be spun and advanced either simultaneously or separately. For example, in a preliminary installation step the tool can be spun so that the tip 240 makes incidental contact with the workpiece. The friction from this incidental contact will heat the area surrounding the receiving hole and soften the workpiece material and thereby lower the rotational and compressive forces needed to install the fastener.

An installation tool in accordance with a further embodiment of the invention is shown in FIG. 10 and is designated generally by reference numeral 320. The tool 320 has an elongate, generally-cylindrical casing 348, which has a tip 340 at the bottom with a structure and characteristics that are similar to the tool shown in FIG. 8. A spindle 341 is fixed to and extends from the upper end of the casing 348, which serves the same function as described above with respect to the embodiment of FIG. 9

Similar to the embodiment shown in FIG. 9, within the bore 330 of the casing 348, the tool 320 has a compression spring 325 seated between two thrust bearings 342. At the upper end, the spring 325 is connected to the thrust bearing by a coupler 343. At the lower end, the spring 325 is seated against one side of a fastener pusher 322. The other side of the pusher 322 is seated in another thrust bearing 342. Wedge-shaped displacers 327 extend axially from the tip 340 of the tool. In this embodiment, the tool 320 includes a central, center punch 345 extending axially through the upper casing, through the pusher 322, and through the tip 340. The punch 345 has a pointed distal tip 346 and is used in conjunction with a donut-shaped hole in the same manner as described with respect to the embodiment of FIG. 8. The punch 345 is isolated from the pusher 322 and moves with the tool tip 20. The tool 320 includes the same fluid communication channels as the tool shown in FIG. 9.

Figure 11:
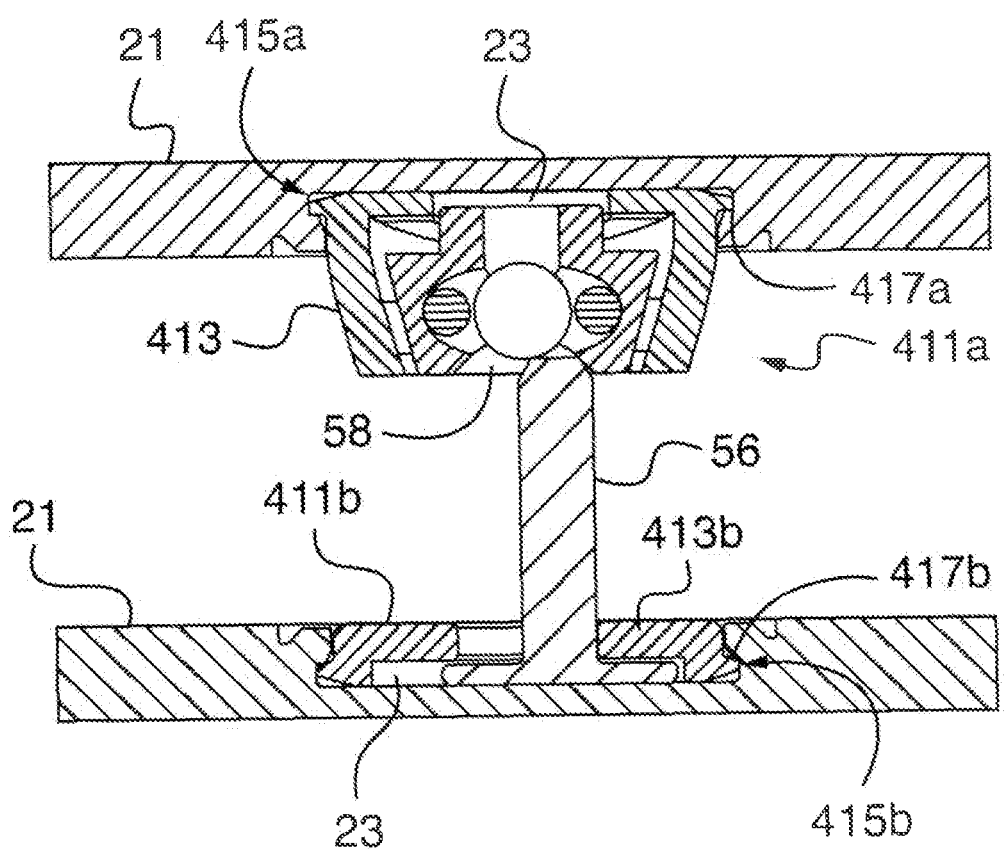
FIG. 11 is a cross-section of a two-part fastener for joining two workpieces in accordance with an additional preferred embodiment of the invention.

In the embodiments described above, the fastener 11 has a construction similar to an internally-threaded nut or stand-off. However, it should be appreciated that fasteners in accordance with preferred embodiments of the invention may have a construction similar to other known fasteners while incorporating the novel features described above. For example, a two-part fastener arrangement is shown in the embodiment of FIG. 11. A first fastener 411a resembling a floating-pin retainer is shown in conjunction with a second fastener 411b containing a magnetic catch 58 for a pin 56. In these embodiments, each fastener 411a, 411b is installed in its own workpiece, such as cooperating panels of a communications device or computer.

Each fastener 411a, 411b of the two part arrangement comprises a body 413a, 413b, respectively, having an axial bore. The bottom of each body 413a, 413b includes a radially-protruding shank 415a, 415b, respectively, having a construction similar to the shank 15 of the fastener 11 described above with respect to FIGS. 1-3. The fasteners 411a, 411b are installed in blind holes 23 in each of the workpieces 21 using the same installation techniques and tooling described above. During downward translation and rotation of the tool during installation, material surrounding the blind hole 23 is cold deformed inwardly onto the top surface 417a, 417b of the shank 415a, 415b, respectively. When the panels are brought together, the pin 56 of one fastener 411b mates with the catch 58 of the other fastener 411a to join the panels. This arrangement of parts is particularly suited to the casing of a laptop computer where visible marking on the outside of the cases is unwanted.

Figure 12:
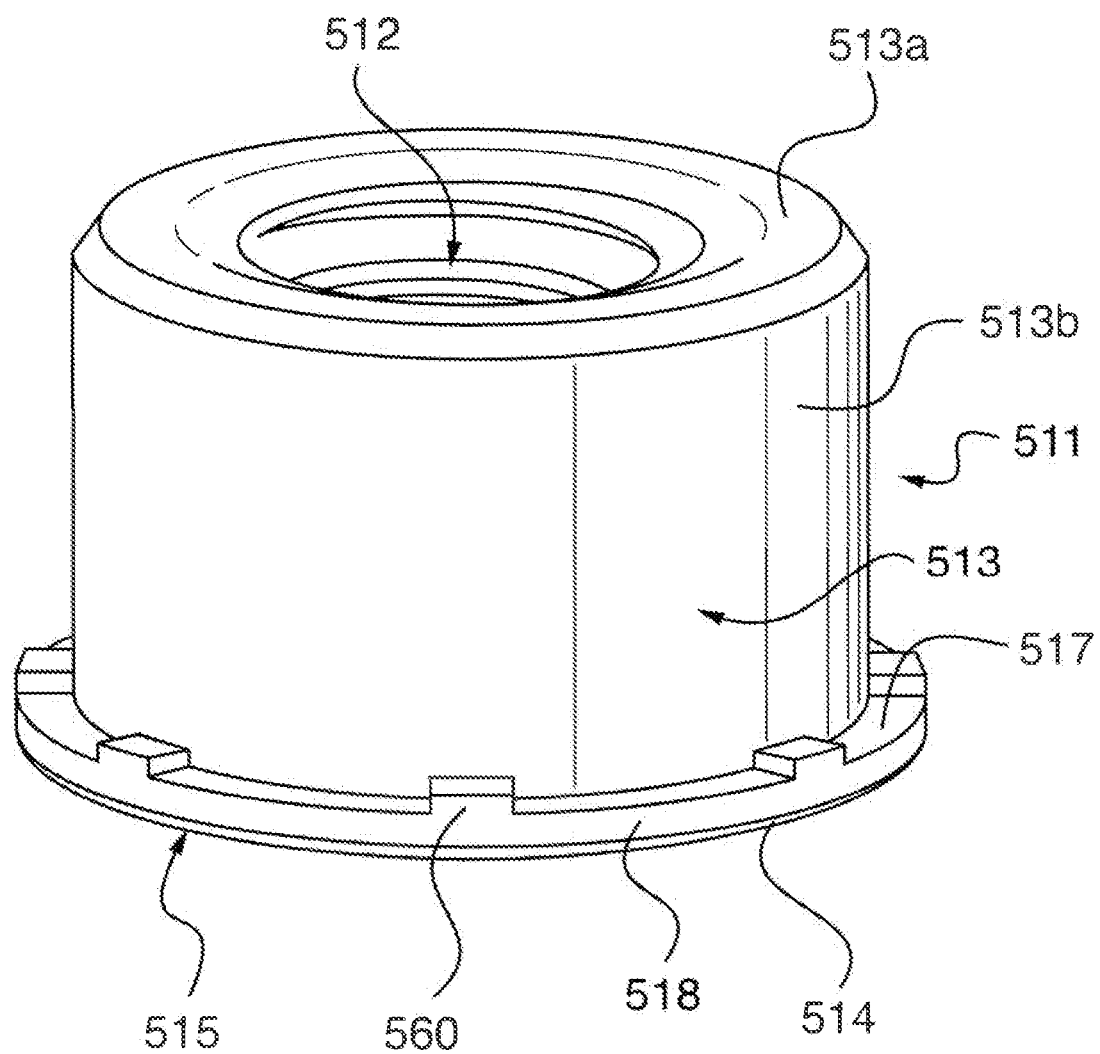
FIG. 12 is a perspective view of a fastener in accordance with another preferred embodiment of the invention; and, FIG. 13 is a side elevation of the fastener of FIG. 12.
Figure 13:
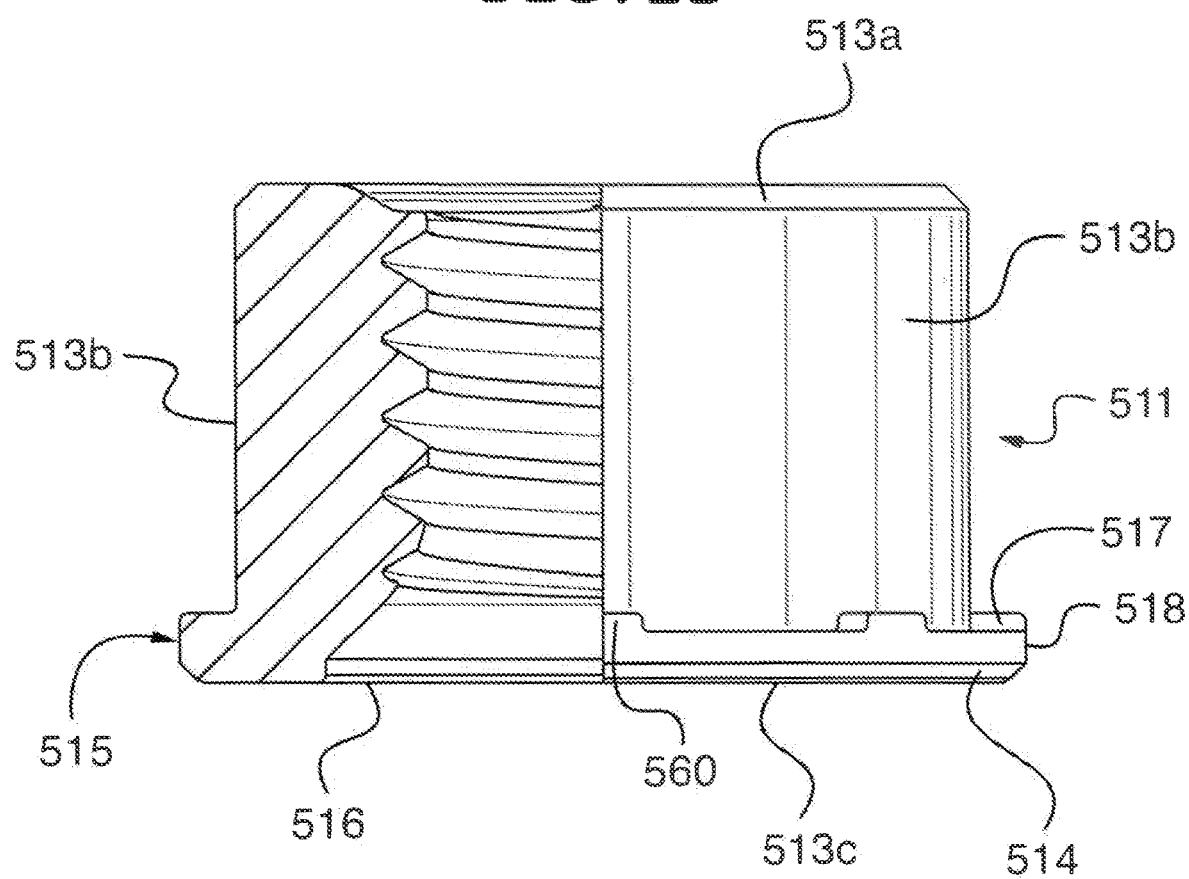

A fastener in accordance with yet a further preferred embodiment of the invention is shown in FIGS. 12 and 13 and is designated generally by reference numeral 511. The fastener generally comprises a cylindrical body 513 having an axial, threaded bore 512 that extends completely through the body 513 from the top 513a to the bottom 513c of the body 513. The bottom of the body 513 includes a radially-protruding shank 515 having a top surface 517, a side surface 518, a chamfer 514, and a bottom surface 516. In a preferred embodiment, the top surface 517 of the shank 515 is generally annular and lies in a plane that is orthogonal to the central axis of the body, and parallel to the top 513a and bottom 513c of the fastener body 513. Preferably, the side walls 518 are cylindrical, and co-axial with and parallel to the side walls 513b of the body 513. Preferably the surface of the chamfer 514 extends at an angle that is skew to the central axis of the body 513, and tapers downwardly-inwardly from the side surface 518 towards the bottom of the body 513. In a preferred embodiment, the bottom surface 516 of the shank 515 is flat, annular and lies in a plane that is orthogonal to the central axis of the body 513, and parallel to the top 513a and bottom 513c of the body 513. In a preferred embodiment, the bottom surface 516 is continuous and co-planar with the bottom 513c of the body 513.

In contrast to the notches 19 of the embodiment shown in FIG. 1, the shank 515 includes a plurality of lugs 560 to provide torque resistance once installed in the workpiece. Metal from the workpiece is cold deformed onto the top surface 517 of the shank in between the lugs. Depending on the thickness of the workpiece, material may also be cold deformed onto the top of the lugs 560. In a preferred embodiment, the lugs 560 are equally spaced around the perimeter of the shank. In this embodiment, the lugs 560 are depicted as rectangular blocks but may have any shape that will provide resistance to rotation of the fastener within the hole.

From the foregoing it will be apparent to those of skill in the art that the objects of the invention have been achieved. Furthermore, it will be apparent to those of skill in the art that there are many variations and adaptations of the embodiments disclosed all of which fall within the scope and spirit of the invention which shall be determined only by the claims and their legal equivalents.

What is claimed is:

1. A fastener installation tool, comprising:
   a. a casing having a top end, a bottom end, and a central rotational axis;
   b. a spindle fixed to said top end of the casing and adapted for affixation to a rotary and vertically reciprocal element of an industrial machine;
   c. a tip at the bottom end of the casing having at least one wedge shaped displacer extending axially from an end surface of the tip adapted for deforming a workpiece by pushing material of the workpiece radially inward as the tip rotates and is pressed against the workpiece; and
   d. an axial bore within said tip adapted for holding a fastener installed by the tool.

2. The tool of claim 1, wherein said tip has a distal end surface orthogonal to the axial bore which is constructed and arranged to engage and deform the workpiece.

3. The tool of claim 1, including a displacer on said distal end surface.

4. The tool of claim 3, wherein said displacer is vertically tapered along an arcuate ridge centered about said axial bore from a back end of greatest height down to a front end of minimum height where the ridge meets the end face.

5. The tool of claim 4, wherein an inside edge of said displacer is chamfered from the ridge to the axial bore.

6. The tool of claim 5, wherein said displacer is chamfered from the displacer ridge to an outer edge of the displacer.

7. The tool of claim 6, wherein the width of said displacer is tapered such that the front end of said displacer intersects said distal end surface at a point.

8. The tool of claim 7, including two displacers located 180 degrees apart around the central rotational axis.

9. The tool of claim 8, wherein said displacers are substantially identical and wherein the length of each displacer extends approximately 90 radial degrees around the central rotational axis from the front end to the back end.

10. The tool of claim 1, including fluid communication channels extending from the spindle to the tip for providing a vacuum at the tip when the spindle is connected to a vacuum source, wherein the vacuum holds the fastener within the tip bore while the tool body rotates.

11. The tool of claim 10, further including a center punch extending axially through said axial bore and into the fastener when the fastener occupies the tip.

12. The tool of claim 1 used with a milling machine that may be connected to said spindle.

13. The tool of claim 1, further including a spring-biased fastener pusher constructed and arranged to apply an axial insertion force on a fastener within the tip.

14. A fastener installation tool, comprising:
   a. a cylindrical tool body having a first closed axial end, cylindrical side walls, and a second open end having a central, axially-extending blind bore;

b. a wedge-shaped displacer extending axially from the open end of the tool body and surrounding the opening of the bore;

c. a compression spring seated at one end in the bottom of the bore and connected at the other end to a pressure plate having a shape and size that compliments the shape and size of the central bore and permits the pressure plate to freely reciprocate within the bore;

wherein when the fastener is inserted into a blind hole in a workpiece, the tool engages the fastener and the workpiece, and wherein as the tool is rotated, the displacer of the tool is constructed and arranged to cold deform inwardly the material surrounding the blind hole onto a material receiving portion of a fastener.

15. The tool of claim 14 wherein the tool is configured to cold deform a central raised area in the bottom of the blind hole into the fastener.

16. A fastener installation tool, comprising:

a. a casing having a top end, a bottom end, and a central rotational axis;

b. a spindle fixed to said top end of the casing and adapted for affixation to a rotary and vertically reciprocal element of an industrial machine;

c. a tip at the bottom end of the casing adapted for deforming a workpiece as the tip rotates and is pressed against the workpiece; and d. an axial bore within said tip adapted for holding a fastener installed by the tool; and wherein said tip has a distal end surface orthogonal to the axial bore which is constructed and arranged to engage and deform the workpiece and including a displacer on the end surface wherein said displacer is chamfered from the displacer ridge to an outer edge of the displacer.

17. A fastener installation tool, comprising:

a. a casing having a top end, a bottom end, and a central rotational axis;

b. a spindle fixed to said top end of the casing and adapted for affixation to a rotary and vertically reciprocal element of an industrial machine;

c. a tip at the bottom end of the casing adapted for deforming a workpiece as the tip rotates and is pressed against the workpiece; and d. an axial bore within said tip adapted for holding a fastener installed by the tool including fluid communication channels extending from the spindle to the tip for providing a vacuum at the tip when the spindle is connected to a vacuum source, wherein the vacuum holds the fastener within the tip bore while the tool body rotates.

* * * * *